(12) United States Patent
Kaneko

(10) Patent No.: US 9,643,456 B2
(45) Date of Patent: May 9, 2017

(54) MOLDING ELEMENT INCLUDING CUTTING MEANS FOR MOLDING AND VULCANIZING AT LEAST ONE TIRE TREAD

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventor: Shuichi Kaneko, Tokyo (JP)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/655,354

(22) PCT Filed: Dec. 16, 2013

(86) PCT No.: PCT/EP2013/076640
§ 371 (c)(1),
(2) Date: Jun. 25, 2015

(87) PCT Pub. No.: WO2014/102076
PCT Pub. Date: Jul. 3, 2014

(65) Prior Publication Data
US 2015/0328934 A1    Nov. 19, 2015

(30) Foreign Application Priority Data
Dec. 28, 2012 (FR) .................................... 12 62922

(51) Int. Cl.
*B29D 30/06* (2006.01)
*B60C 11/03* (2006.01)

(52) U.S. Cl.
CPC .......... *B60C 11/03* (2013.01); *B29D 30/0606* (2013.01); *B29D 2030/0613* (2013.01)

(58) Field of Classification Search
CPC .................... B29D 30/0606; B29D 2030/0613
See application file for complete search history.

(56) References Cited

U.S. PATENT DOCUMENTS 6,564,840 B2 * 5/2003 Kleinhoff .............. B29C 33/301
152/209.18
7,143,799 B2 * 12/2006 Collette ............. B29D 30/0606
152/209.21

(Continued)

FOREIGN PATENT DOCUMENTS

CN    102123878 A    7/2011
WO    99/21701 A1    5/1999

OTHER PUBLICATIONS

International Search Report for PCT/EP2013/076640 dated Mar. 17, 2014.

*Primary Examiner* — James Mackey
(74) *Attorney, Agent, or Firm* — Dickinson Wright PLLC

(57) ABSTRACT

A mold element for molding and vulcanizing a tire tread having a plurality of raised elements, each raised element having a contact face intended to come into contact with a road surface and lateral faces connected thereto. The mold element comprises cutting blades able to cut a cover layer already applied to a green form of the tire. Each cutting blade comprises a body, at least one of the cutting blades comprises a protrusion projecting from this body, able to drive a cut part of the cover layer into the depth of the green tire to cover all or part of a lateral face of a raised element. The cutting blade comprises, at one end of the body, a cutting edge forming an acute angle α for cutting the cover layer.

5 Claims, 5 Drawing Sheets

(56) References Cited

U.S. PATENT DOCUMENTS

| | | | |
|---|---|---|---|
| 8,162,642 B2 * | 4/2012 | Van Nguyen | B60C 11/12 425/28.1 |
| 8,708,011 B2 * | 4/2014 | Matsumoto | B60C 11/12 152/209.21 |
| 2003/0101851 A1 | 6/2003 | Domange | |
| 2005/0109438 A1 | 5/2005 | Collette | |
| 2006/0027295 A1 | 2/2006 | Knispel | |
| 2011/0162770 A1 | 7/2011 | Yamakawa | |

\* cited by examiner

MOLDING ELEMENT INCLUDING CUTTING MEANS FOR MOLDING AND VULCANIZING AT LEAST ONE TIRE TREAD

This application is a 371 national phase entry of PCT/EP2013/076640, filed 16 Dec. 2013, which claims priority of French Patent Application No. 1262922, filed 28 Dec. 2012, the entire contents of which are incorporated herein by reference for all purposes.

BACKGROUND

Field

The present disclosure relates to the field of molds for molding and vulcanizing a tire tread. More specifically, the invention relates to the molds used for molding in the tread blocks which are partially or completely covered by a cover layer.

Description of Related Art

It is known practice to design tires the tread of which comprises various rubber compounds. Document WO 03089257 discloses such treads. More specifically, document WO 03089257 discloses a tread comprising tread blocks the walls of which are covered with a cover layer. The material of which this cover layer is made differs from the rubber compound of which the tread is made. This material notably has much better wet grip than the wet grip of the rubber compound. This allows a very significant improvement in cornering performance on wet ground.

One way of manufacturing this tread is notably disclosed in document WO 2006069912. According to this method of manufacture, in a first step, provision is made for the material intended to constitute a cover layer to be injected in the form of one or more inserts into the green tire using an injection nozzle. The insert or inserts is or are then shaped, in a second step, by ribs of a vulcanizing mold so that they cover all or part of the walls of the grooves molded by these ribs.

This method of manufacture has its limits, particularly as far as obtaining precision moldings is concerned. Specifically, during the shaping thereof, the insert experiences a significant shear force from the rib in order to convert this insert into a layer of lesser thickness. This shear force may cause cracking within the insert, making it more difficult to control the movements of the material of which this insert is made. The shape and the thickness of the cover layer thus formed may therefore be somewhat haphazard. The advantages afforded by the additional layer to the performance of the tire are then reduced.

In addition, in this method of manufacture, it is necessary to make the inserts align with the ribs. This makes manufacture of the tread more complicated.

There is therefore a need to improve the incorporation of a cover layer on the walls of tread blocks of a tire tread.

DEFINITIONS

A "tire" means all types of elastic tire whether or not subjected to an internal pressure.

A "green tire" or "green form" of a tire means a superposition of a plurality of semi-finished rubber products present in the form of strips or sheets, with or without reinforcement. The green tire is intended to be vulcanized in a mold in order to obtain the tire.

The "tread" of a tire means a quantity of rubber material bounded by lateral surfaces and by two main surfaces one of which is intended to come into contact with a road surface when the tire is running.

A "tread surface" means the surface formed by those points on the tire tread that come into contact with the road surface when the tire is running.

A "raised element" in a tread means a protruding rubber element in this tread.

A "mold" means a collection of separate mold elements which, when brought closer towards one another, delimit a toroidal molding space.

A "mold element" of a mold means part of a mold. A mold element is, for example, a mold segment.

A "molding surface" of a mold element means the surface of the mold element that is intended to mold all or part of the tread surface of the tire tread.

A "sipe blade" of a mold element means a protrusion projecting from the molding surface and intended to mold sipes in the tire tread, which means cuts which at least partially close up when they fall within the contact patch where the tire makes contact with the ground.

A "cutting blade" means a blade comprising cutting means able to cut a cover layer present on the external surface of a green tire.

SUMMARY

The invention, in an embodiment, relates to a molding element for molding and vulcanizing a tire tread. This tread comprises a plurality of raised elements, each raised element comprising a contact face intended to come into contact with a road surface and lateral faces connected to this contact face. The mold element comprises cutting blades able to cut a cover layer previously applied to a green form of the tire. With each cutting blade comprising a body, at least one of the cutting blades comprises a protrusion projecting from this body, this protrusion being able to drive a cut part of the cover layer into the depth of the green tire to cover all or part of a lateral face of a raised element. The cutting blade comprises, at one end of the body, a cutting edge forming an acute angle α for cutting the cover layer.

The cutting sipe blades are able to cut a cover layer that covers an external surface of a green tire. The protrusion itself guides a cut part of the cover layer into the green tire.

The invention, in an embodiment, thus proposes that the cover layer be cut and some of this layer be positioned within the depth of the green tire during one and the same movement of the mold element with respect to the green tire.

An alternative form of embodiment, the protrusion is discontinuous along the length of the cutting sipe blade.

In a preferred embodiment, the protrusion comprises at least one driving pad.

The ability of the protrusion to catch the cover layer and drive it into the depth of the green tire is thus improved.

In one preferred embodiment, the protrusion has a triangular profile.

This facilitates extraction of the cutting sipe blade from the tire once the tire has been vulcanized.

In an alternative form of embodiment, the cutting blade comprises two protrusions positioned one on each side of the body of the blade.

It is thus possible to cover with cover layers both of the two walls that delimit the sipe molded by the cutting sipe blade.

Another subject of the invention is a mold comprising a plurality of mold elements as described hereinabove.

BRIEF DESCRIPTION OF THE DRAWINGS

Other features and advantages of the invention will emerge from the following description, given by way of nonlimiting example, with reference to the attached drawings in which.

DETAILED DESCRIPTION OF SPECIFIC EMBODIMENTS

In the description that follows, elements that are substantially identical or similar will be denoted by identical references.

Figure 1:
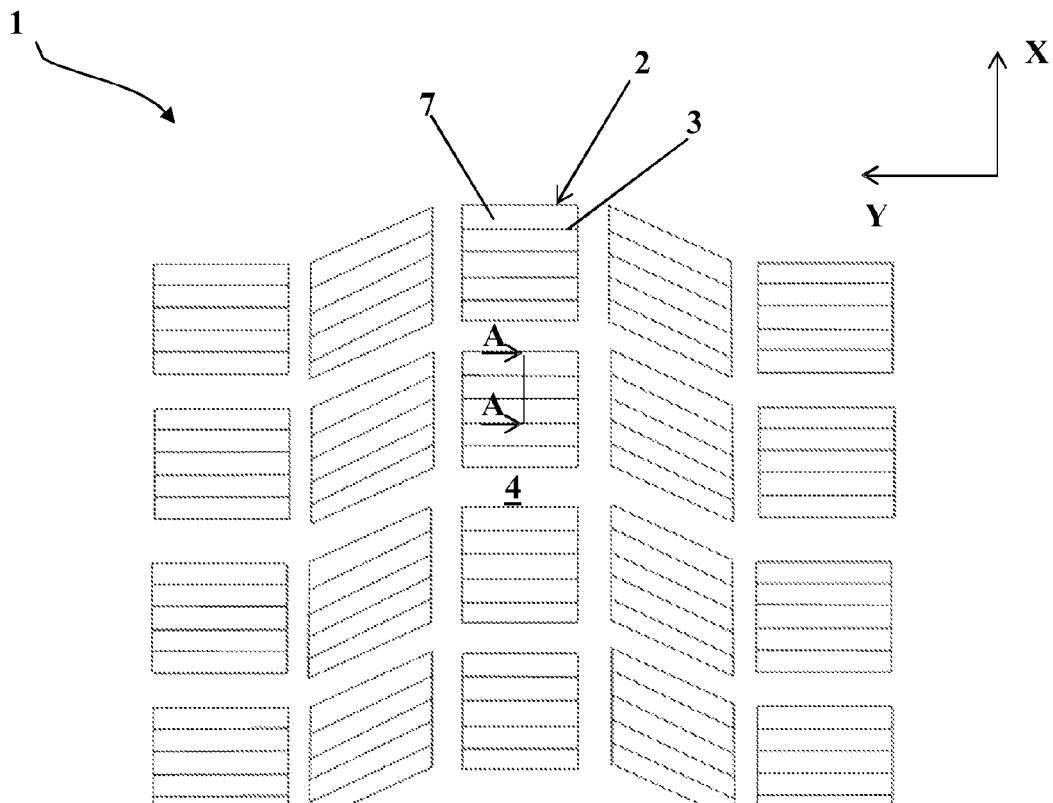
FIG. 1 schematically depicts a part of a tire tread.

FIG. 1 depicts part of a tread 1 of a tire. This tread comprises a plurality of raised tread blocks 2 organized to form the tread pattern of this tread. The tread blocks 2 are delimited by grooves 4 which may run in an axial direction Y parallel to the axis of rotation of the tire, in a circumferential direction X perpendicular to the axial direction Y, or in an oblique direction that has both a non-zero circumferential component and a non-zero axial component. Each tread block 2 here is divided into a plurality of rubber strips 7 separated by sipes 3.

Figure 2:
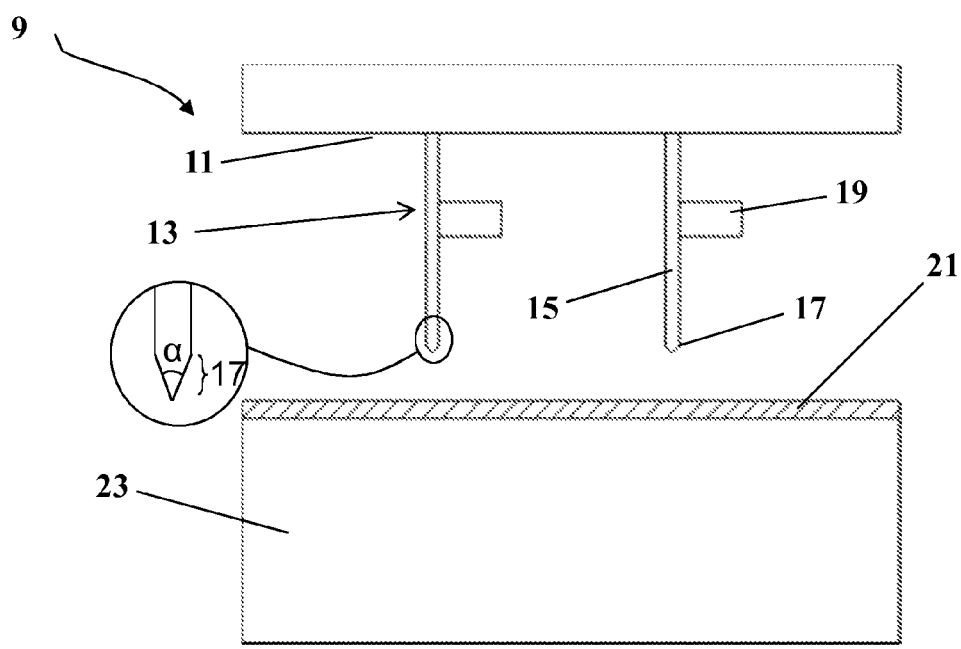
FIG. 2 schematically depicts a mold element according to an embodiment of the invention which is able to mold part of the tread of FIG. 1.

FIG. 2 depicts a mold element 9 able to mold part of the tread of FIG. 1. This mold element comprises a molding surface 11 able to mold part of a tread surface of a tread and cutting sipe blades 13 projecting from the molding surface 11. Each cutting sipe blade 13 comprises a body 15, cutting means 17 situated at one end of this body 15, and a protrusion 19 projecting from the body 15. The cutting means 17 here take the form of a cutting edge having an acute angle α less than or equal to 60°. In one preferred embodiment, the angle α is less than or equal to 35°. In another preferred embodiment, the angle α is less than or equal to 20°.

Figure 3:
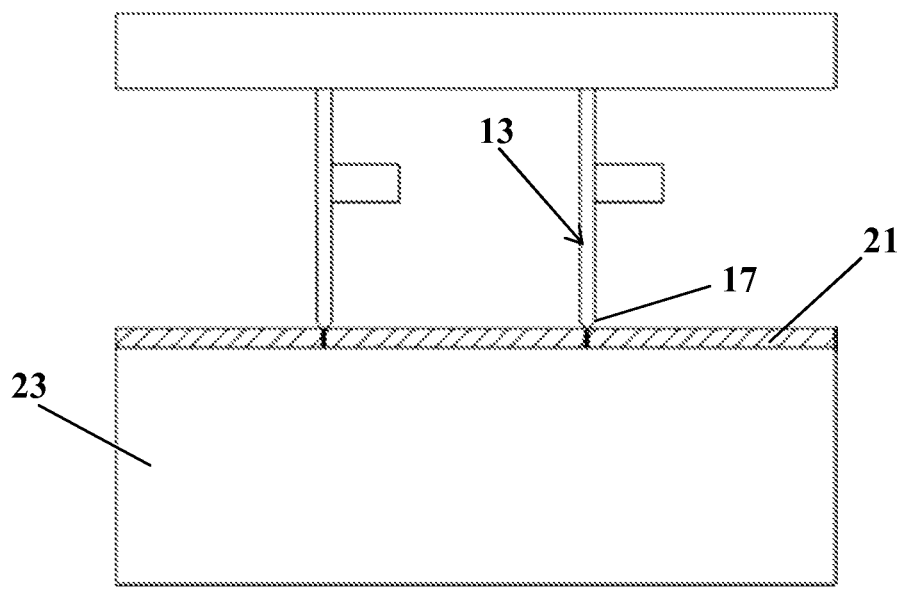
FIG. 3 illustrates a first step of molding using the mold element of FIG. 2.

FIG. 3 illustrates a first step of molding in which the cutting means 17 of the cutting sipe blades 13 are in contact with a cover layer 21 covering the green form 23 of a tire.

This cover layer 21 here has an elastic modulus higher than the elastic modulus of the rubber material of which the tread 1 is made. Such a material is, for example, an elastomeric material of which the dynamic shear modulus G*, when subjected to a maximum alternating stress of 0.7 MPa, at a frequency of 10 Hz and a temperature of −10° C., is higher than 200 MPa and preferably higher than 300 MPa. In this document, the terms "elastic modulus G'" and "viscous modulus G''" denote dynamic properties well known to those skilled in the art. These properties are measured on a Metravib VA4000 viscoanalyser on test specimens molded from uncured compositions. Test specimens such as those described in the standard ASTM D 5992—96 (the version published in September 2006, initially approved in 1996), in Figure X2.1 (circular procedure) are used. The diameter of the test specimen is 10 mm (and it therefore has a circular cross section of 78.5 mm$^2$), the thickness of each of the portions of rubber composition is 2 mm, giving a "diameter-to-thickness" ratio of 5 (contrary to standard ISO 2856, mentioned in the ASTM standard at paragraph X2.4, and which recommends a d/L value of 2). The response of a test specimen of vulcanized rubber composition subjected to a simple alternating sinusoidal shear stress at a frequency of 10 Hz is recorded. The test specimen is loaded under sinusoidal stressing at 10 Hz, with the stress (0.7 MPa) applied symmetrically about its equilibrium position. The measurements are taken during an increasing temperature gradient of 1.5° C. per minute, from a temperature Tmin below the glass transition temperature (Tg) of the material, up to a temperature Tmax which may correspond to the rubber plateau of the material. Before commencing the sweep, the test specimen is stabilized at the temperature Tmin for 20 minutes in order to obtain a uniform temperature throughout the test specimen. The result used is the dynamic shear elastic modulus (G') and the viscous shear modulus (G") at the chosen temperatures (in this instance 0°, 5° and 20° C.). The "complex modulus" G* is defined as the absolute value of the complex sum of the elastic modulus G' and viscous modulus G" values: $G^* = \sqrt{(G'^2 + G''^2)}$.

In one alternative form of embodiment, the elastomeric material of the cover layer contains a composition based on at least one diene elastomer with a very high sulphur content, such as ebonite.

In another alternative form of embodiment, the cover layer comprises a collection of fibers, for example a three dimensional collection of fibers forming felt. The fibers in this felt may be selected from the group consisting of textile fibers, mineral fibers and mixtures thereof. It will also be noted that the fibers in this felt may be chosen from textile fibers of natural origin, for example from the group of silk, cotton, bamboo, cellulose, wool fibers and mixtures thereof.

In another alternative form of the embodiment, the elastomeric material of the cover layer contains a composition based on at least one thermoplastic polymer, such as polyethylene terephthalate (PET). Such a polymer may have a Young's modulus higher than 1 GPa.

Figure 4:
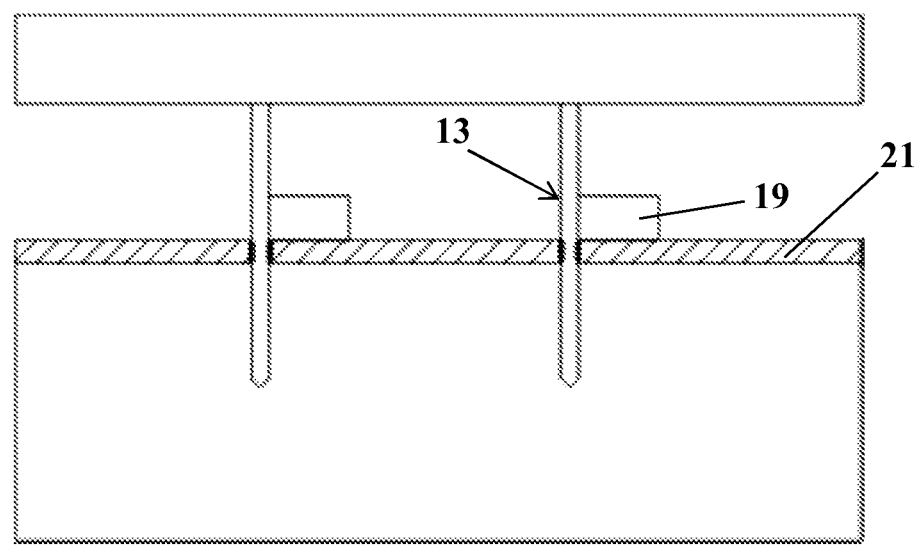
FIG. 4 illustrates a second step of molding using the mold element of FIG. 2.

FIG. 4 illustrates a second molding step in which the cutting sipe blades 13 have cut the cover layer 21 and the protrusion 19 comes into contact with part of this cut cover layer 21.

Figure 5:
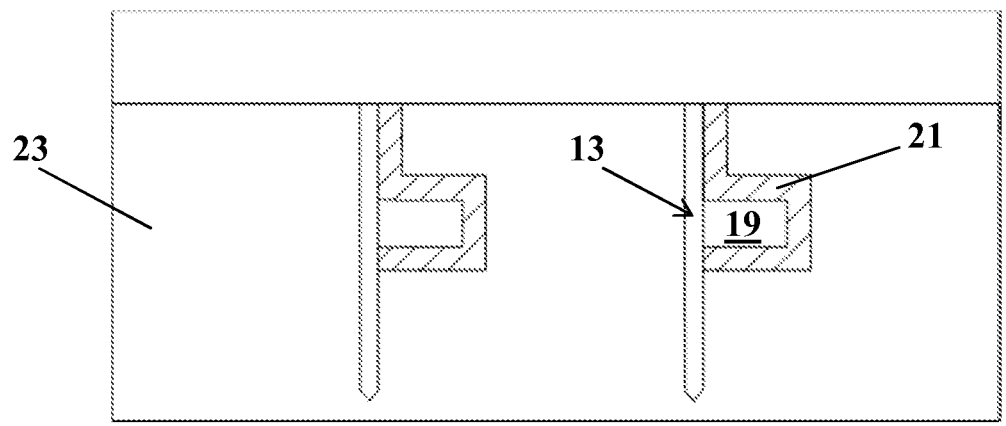
FIG. 5 illustrates a third step of molding using the mold element of FIG. 2.

FIG. 5 illustrates a third molding step in which the cutting sipe blade 13 is positioned wholly in the green tire 23. The cut part of the cover layer 21 has been driven into the depths of the green tire 23 by the protrusion 19.

Figure 6:
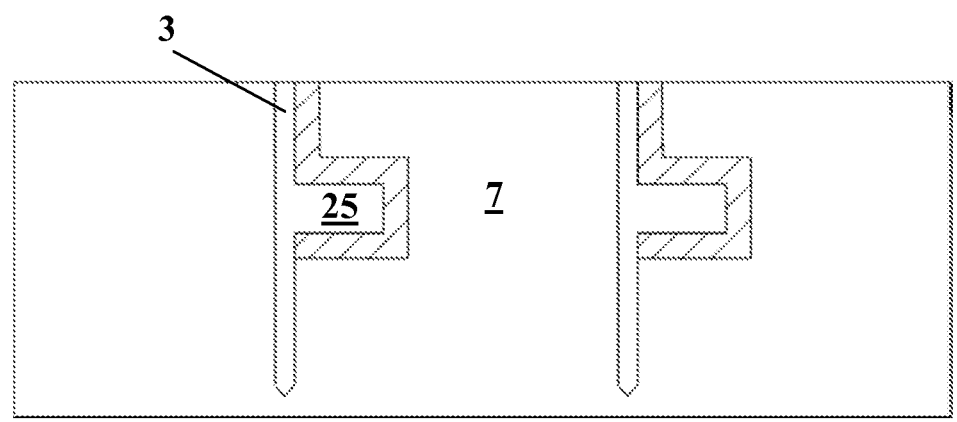
FIG. 6 schematically depicts part of the tread of a tire obtained following the molding steps of FIGS. 3-5.

In molding steps that have not been depicted, the green tire is then vulcanized to obtain a pneumatic tire and the cutting sipe blade 13 is extracted from this tire with the opening of the mold. FIG. 6 depicts part of the tread of this tire. More specifically, FIG. 6 depicts the tread of FIG. 1 in section on A-A. In this sectional view, the strips of rubber 7 delimited by the sipes 3 comprise depressions 25 which have been molded by the protrusions 19. These depressions are delimited by the cover layer 21.

Figure 7:
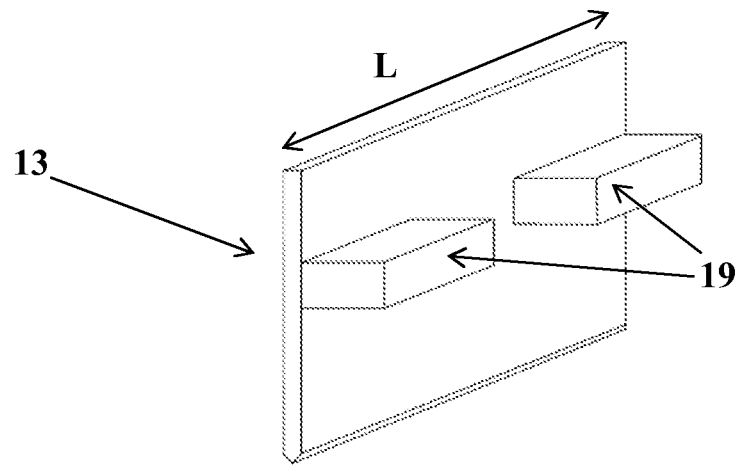
FIG. 7 schematically depicts a second alternative form of the cutting sipe blade of FIG. 2.

FIG. 7 depicts a second alternative form of the cutting sipe blade 13 in which the protrusion 19 is discontinuous along the length L of this sipe blade 13.

Figure 8:
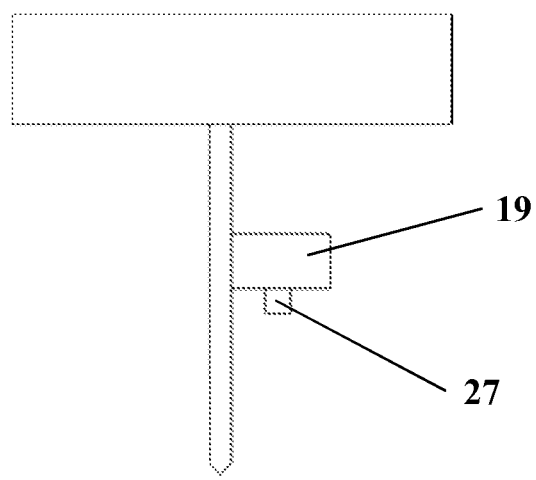
FIG. 8 schematically depicts a third alternative form of the cutting sipe blade of FIG. 2.

FIG. 8 depicts a third alternative form, in which the protrusion 19 comprises at least one driving pad. This pad is intended to improve the ability of the protrusion 19 to catch the cover layer and drive it into the depth of the green tire.

Figure 9:
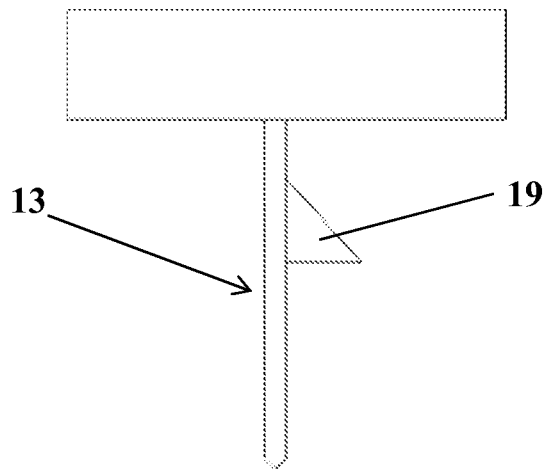
FIG. 9 schematically depicts a fourth alternative form of the cutting sipe blade of FIG. 2.

FIG. 9 depicts a fourth alternative form in which the protrusion 19 has a triangular profile to make it easier to extract from the tire once the latter has been vulcanized.

Figure 10:
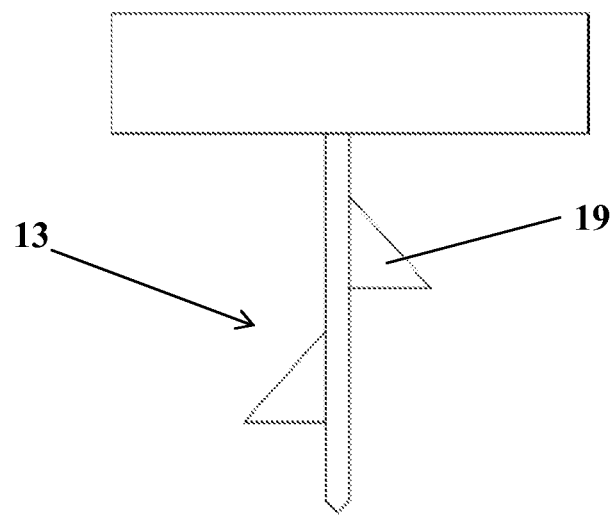
FIG. 10 schematically depicts a fifth alternative form of the cutting sipe blade of FIG. 2.

FIG. 10 depicts a fifth alternative form in which the cutting sipe blade 13 comprises two protrusions 10 positioned one on each side of the body 15 of the sipe blade 13. These protrusions in this instance are offset in the heightwise direction of the sipe blade 13. As an alternative, these protrusions could be positioned opposite each other.

The invention is not restricted to the examples described and depicted and various modifications can be made thereto without departing from its scope.

The invention claimed is:

1. A mold element for molding and vulcanizing a tire tread, the tread comprising a plurality of raised elements, each raised element comprising a contact face adapted to come into contact with a road surface and lateral faces connected to this contact face, wherein the mold element comprises:

cutting blades adapted to cut a cover layer already applied to a green form of a tire, wherein each cutting blade comprises a body, wherein at least one of the cutting blades comprises a protrusion projecting from the body, wherein the protrusion is adapted to drive a cut part of the cover layer into the depth of the green tire to cover all or part of a lateral face of a raised element, wherein the cutting blade comprises, at one end of the body thereof, a cutting edge forming an acute angle α for cutting the cover layer, and wherein the protrusion comprises a driving pad, the driving pad being defined as a second protrusion rectangular-shaped and situated on a surface of the protrusion that comes in contact with the cover layer first.

2. The mold element according to claim 1, wherein the protrusion is discontinuous along the length (L) of the cutting blade.

3. The mold element according to claim 1, wherein, viewed in cross section, the protrusion has a triangular profile.

4. The mold element according to claim 1, wherein the cutting blade comprises two protrusions arranged one on each side of the body of the blade.

5. A mold for molding and vulcanizing a tire tread, the mold comprising a plurality of mold elements according to claim 1.

* * * * *